(12) United States Patent
Werner et al.

(10) Patent No.: US 9,933,039 B2
(45) Date of Patent: Apr. 3, 2018

(54) HYBRID DRIVETRAIN HAVING ACTIVE TORSIONAL VIBRATION DAMPING, AND METHOD FOR CARRYING OUT THE ACTIVE TORSIONAL DAMPING

(71) Applicant: Schaeffler Technologies AG & Co. KG, Herzogenaurach (DE)

(72) Inventors: Olaf Werner, Buehl (DE); Michael Huber, Offenburg (DE); Carsten Angrick, Appenweier (DE); Matthias Gramann, Renchen (DE); Martin Dilzer, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 337 days.

(21) Appl. No.: 14/141,885

(22) Filed: Dec. 27, 2013

(65) Prior Publication Data

US 2014/0109720 A1 Apr. 24, 2014

Related U.S. Application Data

(63) Continuation of application No. PCT/DE2012/000578, filed on Jun. 1, 2012.

(30) Foreign Application Priority Data

Jun. 28, 2011 (DE) .......... 10 2011 078 249
Feb. 9, 2012 (DE) .......... 10 2012 201 948

(51) Int. Cl.
*F02B 75/06* (2006.01)
*F16F 15/14* (2006.01)
(Continued)

(52) U.S. Cl.
CPC .......... *F16F 15/1421* (2013.01); *B60K 6/485* (2013.01); *B60W 10/08* (2013.01);
(Continued)

(58) Field of Classification Search
CPC .............. B60W 20/00; F02N 2200/042; F02N 2300/104; F16D 2500/50287
(Continued)

(56) References Cited

U.S. PATENT DOCUMENTS 4,204,113 A * 5/1980 Giraud .................. G06K 19/07
                                                            235/375
5,113,821 A * 5/1992 Fukui ..................... B60K 31/02
                                                            123/333
(Continued)

FOREIGN PATENT DOCUMENTS

CN        1709743         12/2005
DE     19721298 A1        11/1998
(Continued)

*Primary Examiner* — Marguerite McMahon
*Assistant Examiner* — James Kim
(74) *Attorney, Agent, or Firm* — Kevin L. Parks

(57) ABSTRACT

A drivetrain having an active torsional vibration damping and a method for carrying out the active torsional vibration damping, having an internal combustion engine being affected by torsional vibrations and having a crankshaft, a torsional vibration damper that is operatively connected to the crankshaft and has at least one operating point of low vibration isolation of the torsional vibrations and has a primary inertial mass associated with the crankshaft and an inertial mass associated with a gear input shaft of a gearbox, the inertial mass being rotatable relatively and limitedly with respect to the primary inertial mass against the action of a spring device. The drivetrain also includes an electric motor having a rotating mass operatively connected to the gearbox input shaft, and a control unit, the spring device being formed by linear springs, the rotating mass of the electric motor being designed as a secondary inertial mass.

20 Claims, 2 Drawing Sheets

(51) Int. Cl.
  *B60W 10/08* (2006.01)
  *B60W 30/20* (2006.01)
  *B60K 6/485* (2007.10)
  *B60W 20/00* (2016.01)

(52) U.S. Cl.
  CPC ............ *B60W 20/00* (2013.01); *B60W 30/20* (2013.01); *B60W 2030/206* (2013.01); *Y02T 10/6226* (2013.01); *Y02T 10/7258* (2013.01); *Y10T 74/2131* (2015.01)

(58) Field of Classification Search
  USPC ...................................................... 123/192.1
  See application file for complete search history.

(56) References Cited

U.S. PATENT DOCUMENTS

| | | | | |
|---|---|---|---|---|
| 5,185,543 A * | 2/1993 | Tebbe | ................... | B60K 17/22 123/192.1 |
| 5,193,492 A * | 3/1993 | Kawamura | ............... | F01L 7/04 123/21 |
| 5,236,056 A * | 8/1993 | Pfeffer | ................ | B62D 5/0463 180/446 |
| 5,846,163 A * | 12/1998 | Kimura | ................. | F16H 61/061 477/143 |
| 6,049,182 A * | 4/2000 | Nakatani | ................... | H02P 6/10 318/254.2 |
| 6,059,059 A * | 5/2000 | Schmidt-Brucken | .. | B60K 6/442 180/65.23 |
| 6,447,417 B2 * | 9/2002 | Kanehisa | ............... | B60K 6/365 180/65.1 |
| 6,806,667 B1 * | 10/2004 | Sasaki | ................... | B60K 6/365 180/170 |
| 6,859,693 B2 | 2/2005 | Tamagawa et al. | | |
| 6,911,791 B2 | 6/2005 | Tebbe | | |
| 8,622,860 B2 * | 1/2014 | Versteyhe | .............. | B60K 6/105 475/1 |
| 8,789,670 B2 * | 7/2014 | Antchak | ................ | F16D 7/022 192/212 |
| 2002/0177504 A1 * | 11/2002 | Pels | ........................ | B60K 6/36 477/3 |
| 2005/0016488 A1 * | 1/2005 | Kawakubo | .............. | F02B 61/02 123/192.2 |
| 2006/0249319 A1 * | 11/2006 | Hoare | ...................... | B60K 6/26 180/65.23 |
| 2007/0179012 A1 * | 8/2007 | Kimura | ................... | F16F 15/31 475/331 |
| 2010/0235047 A1 * | 9/2010 | Kurishige | ............ | B62D 5/0472 701/41 |
| 2011/0132137 A1 * | 6/2011 | Kaneyasu | ......... | F16F 15/12346 74/572.2 |
| 2011/0266760 A1 * | 11/2011 | Itabashi | .................. | B60L 11/14 280/5.507 |
| 2012/0316028 A1 * | 12/2012 | Kobayashi | .............. | B60K 6/48 477/5 |

FOREIGN PATENT DOCUMENTS

| | | |
|---|---|---|
| DE | 10035521 A1 | 2/2002 |
| DE | 102010037503 A1 | 3/2011 |
| WO | 01/76041 A1 | 10/2001 |

\* cited by examiner

HYBRID DRIVETRAIN HAVING ACTIVE TORSIONAL VIBRATION DAMPING, AND METHOD FOR CARRYING OUT THE ACTIVE TORSIONAL DAMPING

CROSS-REFERENCE TO RELATED APPLICATIONS

This application is filed under 35 U.S.C. § 120 and § 365(c) as a continuation of International Patent Application No. PCT/DE2012/000578 filed Jun. 1, 2012, which application claims priority from German Patent Application No. 10 2011 078 249.4 filed Jun. 28, 2011, and German Patent Application No. 10 2012 201 948.0 filed Feb. 9, 2012, which applications are incorporated herein by reference in their entireties.

FIELD OF THE INVENTION

The invention relates to a hybrid drivetrain having active torsional vibration damping, and to a method for carrying out the active torsional vibration damping, having a combustion engine subject to torsional vibrations, having a crankshaft, with a torsional vibration damper that is operationally connected to the crankshaft, having at least one operating point of lesser vibration isolation of the torsional vibrations, having a primary inertial mass assigned to the crankshaft and an inertial mass opposite thereto, which is relatively and limitedly rotatable contrary to the effect of a spring device, assigned to a transmission input shaft of a transmission, as well as having an electric machine with a rotating mass that is operationally connected to the transmission input shaft, as well as a control unit.

BACKGROUND OF THE INVENTION

Because of their operating principle of discontinuous combustion of fuel in the combustion spaces of cylinders or combustion chambers provided for that purpose, combustion engines have a non-uniform torque development through the angle of rotation of the crankshaft. The torsional vibrations, which occur as a result, are isolated in a well-known manner by torsional vibration dampers such as clutch plate dampers, divided flywheels and the like, and/or torsional vibration absorbers such as centrifugal force pendulums and the like. This vibration isolation occurs only partially. Remaining residual vibrations appear in resonance with natural frequencies of the power train, which result in negative sound behavior of the drivetrain and/or negatively affect the service life of the components used. To further improve the degree of isolation, the technical effort increases, so that the isolation devices to be utilized, such as torsional vibration dampers or torsional vibration absorbers, cannot always be implemented for reasons of construction space and/or cost. For example, in a torsional vibration damper, besides the utilized bow springs of a single damping stage, additional damping stages, an additional torsional vibration absorber matched to the torsional vibration damper and the like may become necessary. Furthermore, the driver may introduce impulses into the drivetrain, for example, with the respective changing of the position of the accelerator pedal, which can result in jerking or load reversal vibrations.

In addition to the combustion engine, hybrid drivetrains have an electric machine which drives the drivetrain completely or partially, recuperates in deceleration mode, and is able to start the combustion engine. An electric machine is known from German Patent No. 195 32 129 A1, which is intended to compensate for torsional vibrations of the combustion engine by switching on opposing torques by means of the electric machine, which are complementary to the peak torques of the combustion engine. The corresponding quantities of energy in the frequency range of the torsional vibrations to be stored temporarily in and recalled from the accumulator connected to the electric machine, such as a lead-acid battery, result in very high charging and discharging currents, which are harmful to the accumulator.

BRIEF SUMMARY OF THE INVENTION

The object of the invention is therefore to propose a device and a method for a hybrid drivetrain, which will enable improved isolation of torsional vibrations of the combustion engine with little technical cost and effort.

The object is fulfilled by a drivetrain having a combustion engine subject to torsional vibrations, having a crankshaft, with a torsional vibration damper that is operationally connected to the crankshaft, having at least one operating point of lesser vibration isolation of the torsional vibrations, having a primary inertial mass assigned to the crankshaft and an inertial mass opposite thereto which is relatively and limitedly rotatable contrary to the effect of a spring device, assigned to a transmission input shaft of a transmission, as well as having an electric machine with a rotating mass that is operationally connected to the transmission input shaft, as well as a control unit, where the spring device is formed of linearly formed springs, for example, coil springs distributed around the circumference, the rotating mass of the electric machine is designed as a secondary inertial mass, and the electric machine can be regulated by means of the control unit to a compensation torque that compensates for a disturbance torque subject to torsional vibration which occurs at at least one operating point.

Through the combination of an active torsional vibration damping by means of the electric machine, since positive or negative moments of compensation corresponding to the torsional vibrations of the combustion engine are transmitted from the electric machine to the drivetrain, the torsional vibration damper can be designed in a simple manner and optimized to the requirements of active torsional vibration damping. In this case, the spring device operating to between the two inertial masses in the circumferential direction can be implemented by means of linearly designed short coil springs, which have a small moment of friction compared to bow springs, even at high speeds of rotation, and are simpler to produce. For example, at low speeds of rotation and during the starting of the combustion engine by the electric machine, the advantages of the device consisting of bow springs can be compensated for by active torsional vibration damping by means of the electric machine.

The secondary inertial mass is integrated into the rotor of the electric machine in one or more pieces or connected to it, achieving construction space advantages and a simpler configuration of the drivetrain. In this case, in the electric machine its electrically live winding part can be provided in the rotor or in the stator. The electric machine is a brushless, electronically controlled electric motor, for example, whose speed of rotation and angle of excitation are registered by means of an integrated incremental displacement or incremental angle sensor.

The active torsional vibration compensation is accomplished in that on the basis of parameters, for example, sensor data or values derived therefrom, a disturbance torque of the drivetrain before or after the torsional vibration damper is ascertained at the at least one operating point, a compensation torque is ascertained, and the compensation torque is imprinted on the electric machine.

As this is happening, the electric machine is electrically connected to a storage device for electrical energy, for example, an accumulator such as a lead-acid storage battery, a lithium ion battery and the like, a power capacitor such as a Gold Cap capacitor, and/or the like. The mechanical energy required for the active torsional vibration damping is fed to or withdrawn from the electrical energy storage device complementarily, contrary to the temporal torque behavior of the combustion engine. The still remaining portions of torsional vibration transmitted via the simplified torsional vibration damper connected ahead of the electric machine are therefore attenuated such that an electric accumulator intended for a motor vehicle having the proposed drivetrain is not overloaded with the charging and discharging currents.

In addition, at least one additional damping element may be provided in the proposed drivetrain parallel to and/or in series with the torsional vibration damper. For example, to a torsional vibration absorber such as a rotational-speed-adaptive torsional vibration absorber in the form of a centrifugal force pendulum may be operationally connected to the primary side, or for example, the secondary side of the torsional vibration damper.

A disturbance torque still pending after the torsional vibration damper, not compensated for by the latter, can be stored in the control unit, for example, depending on at least one parameter, obtained by means of at least one sensor, in the form of characteristic maps representing the disturbance torque, for example, a torque amplitude characteristic map and torque phase characteristic map. These characteristic maps may be set up, for example, empirically or by means of an appropriate simulation of the hybrid drivetrain, and adapted continuously to changes which may come about in the actual drivetrain. The torque amplitude characteristic maps may be laid out, for example, depending on the nature and quality of the available sensors and their data, on the degree of isolation demanded, for example, complete or only partially desired torsional vibration isolation of the remaining disturbance torque due to the active torsional vibration damping by means of the electric machine, on the temperature of the drivetrain or its selected components, manufacturing tolerances and the like. The torque amplitude characteristic maps may be laid out, for example, dependent on the desired degree of isolation, on a gear selected in a transmission of the drivetrain, which affects the situation of the power train resonance, on a net torque such as the effective torque of the combustion engine, the temperature, manufacturing tolerances and the like. The characteristic maps may be integrated into a pre-control element of the electric machine, so that, for example, a compensation torque that compensates for the temporally varying disturbance torque at least partially in a phase-selective manner is superimposed on the other present functions of the electric machine. These are, for example, a starting function of the combustion machine, a generator function in the operation of the combustion machine, a supporting function of the combustion machine in traction mode, a generator function in pushing mode (recuperation), a drive function when the combustion machine is not running, and the like.

A complete isolation of vibrations behind the electric machine can be achieved by compensating for the disturbance torque after the torsional vibration damper in exact phase opposition by means of the compensation torque introduced by the electric machine. In this case, there can be, for example, a regulation of the angular acceleration of the rotor and hence of the output of the torsional vibration damper, and thus, input of the transmission, to zero. It has proven advantageous to not exactly regulate the residual excitation after the electric machine, but rather to undertake merely a partial isolation with a remaining, non-disturbing portion of the torsional vibration in the sense of a simple and robust regulation.

The regulation of the compensation torque can be carried out by means of a P controller which regulates a rotational characteristic, such as angle, angular velocity or speed of rotation, or for example, angular acceleration of the secondary inertial mass. At the same time, different regulator concepts can be utilized, depending on operating points of the active torsional vibration damping. For example, during a starting of the combustion machine by the electric machine, a simple P controller can be regulated to a rotational speed difference between the shafts of the primary and secondary inertial masses. A resonance passageway, which may be present, can be compensated for in this way, while friction of the torsional vibration damper is reduced.

Alternatively or additionally, the at least one operating point can represent an idling of the combustion engine, while an idling regulation of the combustion machine occurs by means of the electric machine, in that a P controller, for example, a PI controller, regulates the compensation torque to maintenance of a mean idling speed of the crankshaft. In so doing, the idling regulation of the combustion engine in the control unit of the combustion engine can be dispensed with, since the combustion engine is stabilized by means of the compensation torque input by the electric machine.

Furthermore, alternatively or additionally, the at least one operating point can represent the occurrence of jerking or load reversal vibrations, introduced, for example, by the driver operating the accelerator pedal, where a regulator, for example, a PD controller, is able to regulate the compensation torque to a compensation of rotational nonuniformities of the secondary inertial mass. As already described earlier, torsional vibrations, which remain after the torsional vibration damper can be compensated for actively by means of appropriate characteristic imps. In this case, a P controller can be utilized to minimize rotational nonuniformities of the speed of rotation of the secondary inertial mass, for example, on the basis of the rotor speed characteristics.

The regulation and active compensation of the torsional vibrations which appear after the torsional vibration damper is accomplished by analyzing the sensor signals of sensors which are preferably present already in the drivetrain. For example, the section torque of the damper as well as the disturbance torque after the torsional vibration damper can be calculated from the rotational characteristics of the masses of the primary and secondary inertial mass, the engine torque of the combustion engine available from the control unit of the combustion engine, for example by means of the CAN bus, and/or ascertained in a comparable manner. In this case, the rotational characteristics of the crankshaft are available for the primary inertial mass and the rotational characteristics of the rotor are available for the secondary inertial mass by means of the corresponding sensors. In the same way, a differential speed of rotation between the primary and secondary inertial masses can be derived from these sensors. Investigations have shown that a sufficiently precise signal for determining the phase position of the crankshaft can be obtained from a sender of the upper dead-center position of one or more cylinders of the combustion engine. The angle of the rotor is obtained, for example, from the qualitative scanning of the sensor for commutation of the electric machine with sufficient precision.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
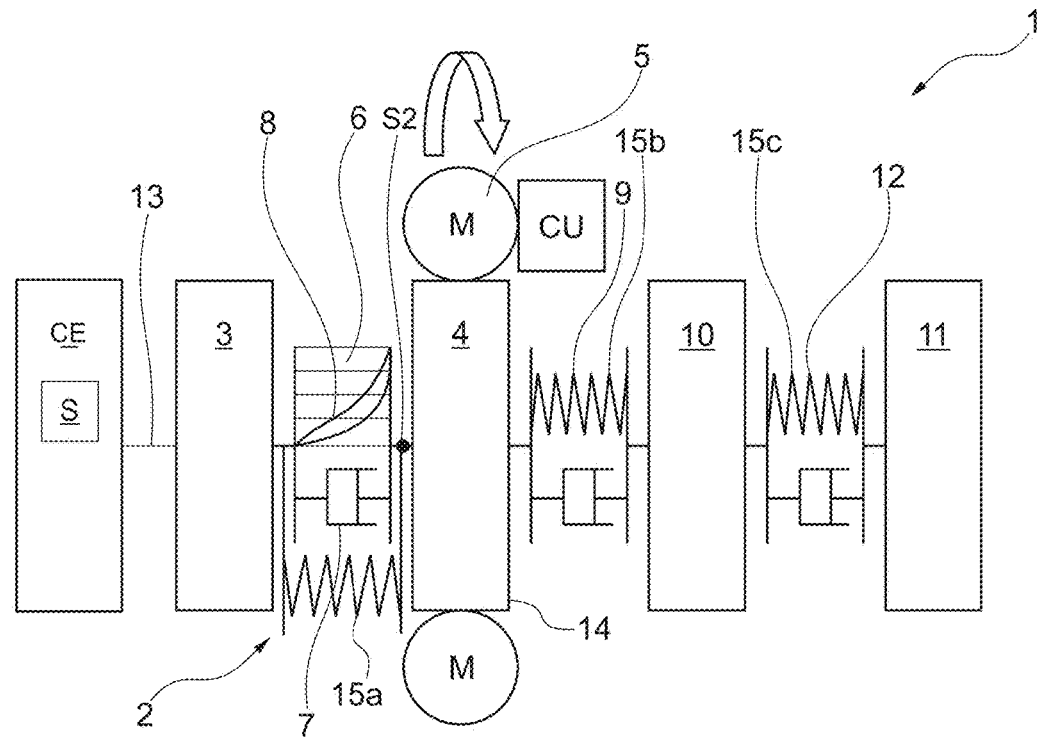
FIG. 1 is a schematic view of a hybrid drivetrain for active torsional vibration damping.

FIG. 1 shows a schematic view of hybrid drivetrain 1 with torsional vibration damper 2, whose primary inertial mass 3 is connected to crankshaft 13 of a combustion engine (not shown) and is driven thereby. Secondary inertial mass 4 is at the same time rotor 14 of electric machine 5, which is situated effectively at the output of torsional vibration damper 2. Inertial masses 3, 4 of torsional vibration damper 2 are situated so that they are rotatable relative to each other, contrary to the effect of spring device 6 and friction device 7. Coil springs 8 depicted in the form of their characteristic curves are of short and linear design, and are positioned around the circumference. Because of the short and linear design of coil springs 8, the moment of friction of friction device 7 is advantageously small. The output part of torsional vibration damper 2 in the form of secondary inertial mass 4 is coupled with transmission 10 by means of frictionally and torsionally elastic transmission input shaft 9. Transmission 10 in turn is coupled vibrationally with vehicle body 11 through the attachment of the latter, and for example, by means of the torsionally elastic and frictionally affected drive shaft(s) 12. This forms a vibration system having natural frequencies which can be excited by power train vibrations, and can thus cause noise loading and mechanical loading of the vehicle and its components.

To be able to keep the design of the construction space small and the mechanical complexity of the torsional vibration damper simple in the form of spring device 6 in hydraulic drivetrain 1, for example, with combustion engines having hard-to-damp torsional vibrations, such as two-cylinder or three-cylinder engines, for example, another residual vibration, not brought about by torsional vibration damper 2, waiting at secondary inertial mass 4, in the form of a dynamic disturbance torque dependent on the angle of rotation, occurs by means of an active torsional vibration damping brought about by means of electric machine 5.

Figure 2:
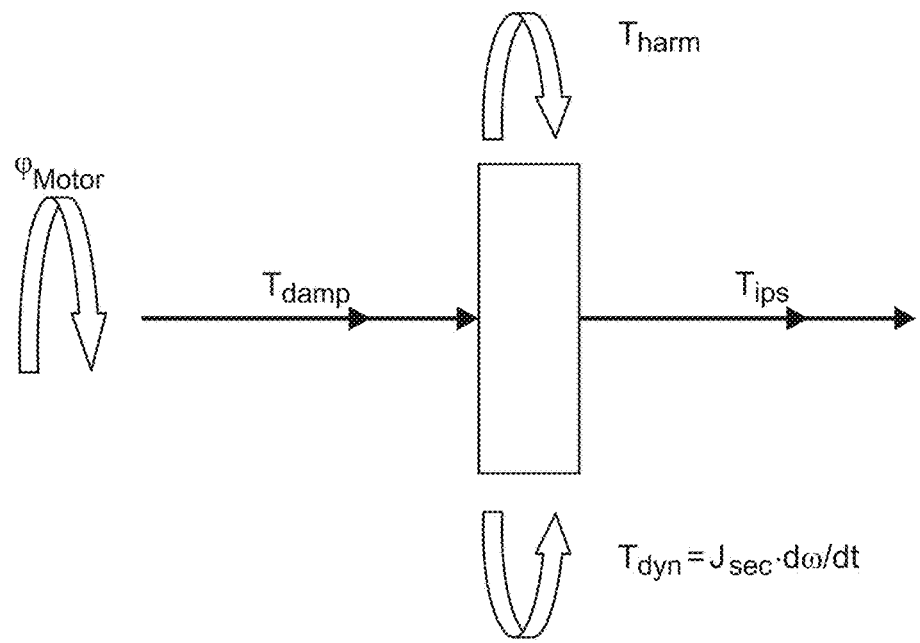
FIG. 2 is a vibration model of the drivetrain of FIG. 1.
Figure 3:
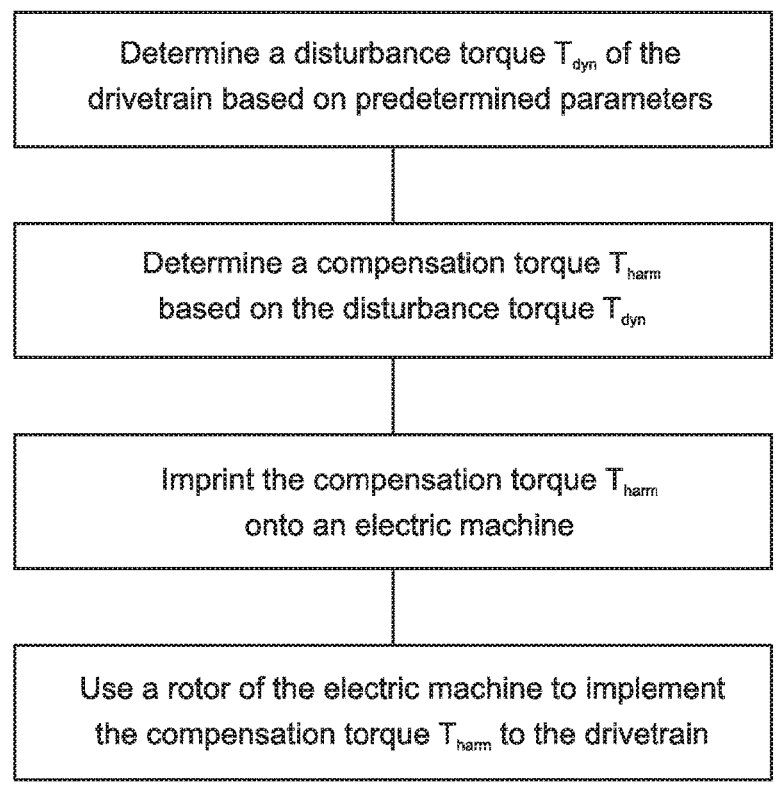
FIG. 3 is a flowchart showing an example method of carrying out active torsional vibration damping in the drivetrain of FIG. 1.

The torque progressions of drivetrain 1 for this can be seen from FIG. 2. In one embodiment, a control strategy to compensate for the torsional vibrations remaining after torsional vibration damper 2 is determined at transmission input shaft 9 by means of the relationship of compensation torque $T_{harm}$ of electric machine 5 to the sum of the other occurring torques such as damper torque $T_{damp}$ at the input of primary inertial mass 3, disturbance torque $T_{dyn}$ of secondary inertial mass 4 from mass moment of inertia $J_{sec}$ of secondary inertial mass 4, its change of angle of rotation $d\omega$ in time interval dt according to the equation $$T_{dyn}=J_{sec}*d\omega/dt$$

corresponding to the dynamic torque, and output torque $T_{ips}$. In this case, the mass moment of inertia $J_{sec}$ results from the mass moment of inertia of secondary inertial mass 4 and the mass moment of inertia of rotor 14 of electric machine 5.

After solving the equation of total torque $T_{sum}$ $$T_{sum}=T_{harm}+T_{damp}+T_{ips}-T_{dyn}$$

the compensation torque turns out to be $$T_{harm}T_{damp}-T_{ips}+T_{dyn}.$$

Compensation torque $T_{harm}$ is applied phase-selectively to disturbance torque $T_{dyn}$ of electric machine 5, generated dependent on angle of rotation $\phi_{motor}$ of crankshaft 13, to secondary inertial mass 4. Since the time pattern of summed torque $T_{sum}$ cannot be determined, we take recourse to phase-selective characteristic maps, which are laid out depending on parameters which are known or which can be determined from sensor data, such as speeds of rotation, accelerations, torques and the like. Signals from one or more senders are used by preference as representative parameters for determining the upper dead-center position of one or more cylinders of the combustion engine. To determine a differential angle of crankshaft 13 and rotor 14 of electric machine 5, the sensor such as a differential angle sensor of electric machine 5 is used, which is intended for detecting the angle of rotation of rotor 14 for commutating electric machine 5.

It has been found that in a real environment of drivetrain 1 a rotational angle deviation smaller than 10°, in particular, smaller than 6°, resulting from time delay, is advantageous for active torsional vibration damping, for example, of a four-cylinder engine. This means that for disturbance torque $T_{dyn}$ within an angular shift of 10° or 6° a phase-selective response of compensation torque $T_{harm}$ should be imprinted on secondary inertial mass 4. Based on the example of a four-cylinder engine and damping of a vibration order equal to two with a crankshaft speed of 3000 rpm, a sampling frequency of 10 kHz has therefore proven to be advantageous. This corresponds to a phase angle of 3.6°.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS 1 drivetrain
2 torsional vibration damper
3 primary inertial mass
4 secondary inertial mass (rotor)
5 electric machine
6 spring device
7 friction device
8 coil spring
9 transmission input shaft
10 transmission
11 vehicle body
12 drive shaft
13 crankshaft
14 rotor
15a additional damping element
15b additional damping element
15c additional damping element
$T_{damp}$ damper torque
$T_{harm}$ compensation torque
$T_{ips}$ output torque
$T_{sum}$ summed torque
$T_{dyn}$ disturbance torque
$\phi_{motor}$ angle of rotation
$d\omega$ angle of rotation
dt time interval
$J_{sec}$ mass moment of inertia
CE combustion engine
CU control unit
S sensor
S2 sensor

What is claimed is:

1. A method for carrying out an active torsional vibration damping in a drivetrain having a combustion engine subject to torsional vibrations, the drivetrain comprising a torsional vibration damper that is operationally connected to a crankshaft of the combustion engine, a primary inertial mass arranged on the crankshaft, an electric machine operationally coupled to a transmission input shaft of a transmission, the electric machine having a rotor forming a secondary inertial mass assigned to the transmission input shaft, a spring device coupling the primary inertial mass and the secondary inertial mass to be relatively and limitedly rotatable with respect to each other, and a control unit for regulating an output torque of the electric machine to a compensation torque that compensates for a disturbance torque subject to torsional vibration which occurs at at least one operating point, the method comprising the steps of:
receiving data from at least one sensor;
determining a differential angle of rotation between the primary inertial mass and the secondary inertial mass based on the data;
calculating the disturbance torque of the drivetrain based on predetermined parameters and the differential angle of rotation;
determining the compensation torque based on the disturbance torque;
imprinting the compensation torque onto a memory to be used by the electric machine; and,
using the rotor of the electric machine to implement the compensation torque to the drivetrain.

2. The method as recited in claim 1, wherein the at least one operating point represents an idling of the combustion engine, while an idling regulation of the combustion machine occurs by means of the electric machine, in that a regulator regulates the compensation torque to maintenance of a mean idling speed of the crankshaft.

3. The method as recited in claim 1, wherein the at least one operating point represents the occurrence of jerking or load reversal vibrations, where a regulator regulates the compensation torque to a compensation of rotational non-uniformities of the secondary inertial mass.

4. The method as recited in claim 1, wherein the at least one operating point represents a starting of the combustion engine, where a regulator regulates a differential speed of rotation between the primary and secondary inertial masses to zero.

5. The method as recited in claim 1, wherein the step of receiving data from at least one sensor comprises:
receiving a first set of information from a first sensor operatively arranged before the primary inertial mass.

6. The method as recited in claim 5, wherein the first sensor is operatively arranged in the combustion engine.

7. The method as recited in claim 1, wherein the primary inertial mass, the secondary inertial mass and the spring device form a torsional vibration damper.

8. The method as recited in claim 7, wherein the spring device is formed of linearly formed springs distributed around a circumference of the torsional vibration damper.

9. The method as recited in claim 7, wherein the step of receiving data from at least one sensor comprises:
receiving a first set of information from a first sensor operatively arranged before the primary inertial mass; and,
receiving a second set of information from a second sensor operatively arranged after the torsional vibration damper.

10. The method as recited in claim 1, wherein the step of imprinting the compensation torque onto a memory to be used by the electric machine comprises:
obtaining at least one parameter from the at least one sensor;
creating one or more torque characteristic maps based on at least one parameter; and,
storing the one or more torque characteristic maps onto the memory to be used by the electric machine.

11. The method as recited in claim 10, wherein the one or more torque characteristic maps are:
developed empirically or using a simulation of the hybrid drivetrain; and,
adapted continuously to changes occurring in the drivetrain.

12. The method as recited in claim 1, wherein the step of determining a differential angle of rotation between the primary inertial mass and the secondary inertial mass based on the data comprises:
receiving a signal from the at least one sensor;
determining an upper dead-center position of one or more cylinders of the combustion engine based on the signal; and,
determining the phase position of the crankshaft based on the upper dead-center position.

13. A method for carrying out an active torsional vibration damping in a drivetrain having a combustion engine subject to torsional vibrations, the drivetrain comprising a torsional vibration damper that is operationally connected to a crankshaft of the combustion engine, a primary inertial mass arranged on the crankshaft, an electric machine operationally coupled to a transmission input shaft of a transmission, the electric machine having a rotor forming a secondary inertial mass assigned to the transmission input shaft, a spring device coupling the primary inertial mass and the secondary inertial mass to be relatively and limitedly rotatable with respect to each other, and a control unit for regulating an output torque of the electric machine to a compensation torque that compensates for a disturbance torque subject to torsional vibration which occurs at at least one operating point, the method comprising the steps of:

receiving data from one or more sensors;

determining a differential speed of rotation between the primary and secondary inertial masses based on the data;

calculating the disturbance torque based on the differential speed of rotation;

determining the compensation torque based on the disturbance torque;

imprinting the compensation torque onto a memory to be used by the electric machine; and, using the rotor of the electric machine to implement the compensation torque to the drivetrain.

14. A method for active torsional vibration damping comprising:

providing a drivetrain comprising:

a combustion engine including a crankshaft with a primary inertial mass;

a transmission input shaft drivingly engaged with an electric machine including a secondary inertial mass;

a torsional vibration damper, including a plurality of linearly formed springs arranged around a circumference, the torsional vibration damper operatively arranged in a torque path between the crankshaft and the transmission input shaft to permit limited relative rotation of the secondary inertial mass relative to the primary inertial mass; and, a control unit;

the method comprising:

exciting the drivetrain with torsional vibrations from the combustion engine;

selecting an operating point of lesser vibration isolation;

determining a disturbance torque $T_{dyn}$ at the operating point of lesser vibration isolation in the torque path after the torsional vibration damper;

calculating a compensation torque $T_{harm}$ to compensate for the disturbance torque; and, applying the compensation torque $T_{harm}$ to the drivetrain with the electric machine.

15. The method for active torsional vibration damping as recited in claim 14, wherein the control unit comprises a P controller for regulating rotation of the second inertial mass to determine the compensation torque $T_{harm}$.

16. The method for active torsional vibration damping as recited in claim 14, wherein:

the drivetrain includes at least one sensor;

the sensor is used to determine the disturbance torque $T_{dyn}$; and, the disturbance torque $T_{dyn}$ is represented by a torque amplitude characteristic map and a torque phase characteristic map stored in the control unit.

17. The method for active torsional vibration damping as recited in claim 14, wherein:

the drivetrain includes an upper dead-center position sender for the combustion engine; and, the upper dead-center position sender is used to determine a phase pattern of the disturbance torque $T_{dyn}$.

18. The method for active torsional vibration damping as recited in claim 14, wherein:

the operating point of lesser vibration isolation is at an idle speed of the combustion engine;

the compensation torque $T_{harm}$ is determined to maintain a mean idle speed of the crankshaft; and, using the electric machine to apply the compensation torque $T_{harm}$ to the drivetrain regulates the idle speed of the combustion engine.

19. The method for active torsional vibration damping as recited in claim 14, wherein:

the operating point of lesser vibration isolation includes jerking or load reversal vibrations; and, the compensation torque $T_{harm}$ is determined to compensate for rotational nonuniformities of the secondary inertial mass.

20. The method for active torsional vibration damping as recited in claim 14, wherein:

the operating point of lesser vibration isolation is selected during a starting of the combustion engine; and, the compensation torque $T_{harm}$ is determined to maintain a zero differential rotational speed between the primary inertial mass and the secondary inertial mass.

\* \* \* \* \*